(12) United States Patent
Nelias

(10) Patent No.: US 7,534,483 B2
(45) Date of Patent: May 19, 2009

(54) LOCAL FOAMING IMPROVEMENT

(75) Inventor: Francois Nelias, Croix (FR)

(73) Assignee: Visteon Global Technologies, Inc., Van Buren Township, MI (US)

( * ) Notice: Subject to any disclaimer, the term of this patent is extended or adjusted under 35 U.S.C. 154(b) by 646 days.

(21) Appl. No.: 11/106,137

(22) Filed: Apr. 14, 2005

(65) Prior Publication Data
US 2005/0233115 A1    Oct. 20, 2005

(30) Foreign Application Priority Data
Apr. 14, 2004   (FR)  .................... 04 03894

(51) Int. Cl.
*B32B 3/00*     (2006.01)
*B60J 5/00*     (2006.01)
*B60K 37/00*    (2006.01)

(52) U.S. Cl. .................. 428/172; 428/71; 428/192; 296/70; 296/146.7; 180/90

(58) Field of Classification Search ............ 428/71, 428/172, 174, 192; 296/70, 146.7; 180/90
See application file for complete search history.

(56) References Cited

U.S. PATENT DOCUMENTS

| | | | |
|---|---|---|---|
| 5,500,168 A | 3/1996 | Suzuki | |
| 5,500,169 A | 3/1996 | Kondo et al. | |
| 5,895,613 A | 4/1999 | Nakai et al. | |
| 6,708,462 B2 * | 3/2004 | Pokorzynski et al. | ...... 52/716.5 |

FOREIGN PATENT DOCUMENTS

EP    0768160 A1    4/1997

* cited by examiner

*Primary Examiner*—Donald Loney
(74) *Attorney, Agent, or Firm*—Brinks Hofer Gilson & Lione

(57) ABSTRACT

The present invention relates to a composite part, and a method for producing a composite part, having a first body with at least one zone forming a depression and being separated from the front face of the first body by a projection forming one or more lateral walls. The depression receives a second foam body that is covered by a covering or finishing element. At least one lateral end portion of the covering element forms an edge held between the foam body and a corresponding lateral wall.

9 Claims, 4 Drawing Sheets

LOCAL FOAMING IMPROVEMENT

BACKGROUND

1. Field of the Invention

The present invention relates to the production of structural and/or decorative parts made of plastics materials. More particularly, it relates to composite parts having at least one portion that is foamed in situ and covered with a skin or the like.

2. Related Technology

The present invention relates to a method for producing a composite part, and a composite part obtained by this method, in particular a structural and/or decorative part that is intended to be fitted inside a motor vehicle.

The invention aims to provide a solution for decorating or modifying, in surface regions, a base body or element made of a rigid material, by attaching to it a soft or resilient coating, forming padding, said additional coating comprising a foam body covered with a skin or similar finishing layer.

It is thus possible to provide rigid plastics material elements or portions with decorative and/or practical elements or parts, which differ not only in terms of visual appearance and feel, but also in terms of texture, mechanical characteristics (deformation) and thermal characteristics (insulation).

One way of industrially producing composite parts of this type is locally foaming a suitable foaming material in a mould, between the base body or substrate, which is made of a rigid material provided with a depression or a recess, and the covering or finishing skin, layer or element.

The two fundamental problems encountered in the implementation of this method are those of preventing foaming material from escaping at the edges of the skin or similar covering element (see the cross-sections of FIGS. 1a and 1b of the accompanying drawings) and providing the interface between visible face of the rigid material part and the skin-covered foam forming the decorative zone with an optimal appearance. In the past, various solutions have been proposed in an attempt to solve the two aforementioned problems.

A first know solution involves producing a recess in the region of the interface zones of the base body or substrate made of rigid material, the recess being intended to receive the edge of the covering or finishing element forming skin. Nevertheless, this solution does not obtain an optimal and systematic tightness between the base body and the skin.

A second known solution involves providing the edges of the coating element and the corresponding interface zones of the base body or substrate with specific mutually complementary shapes, so as to form a chicane in a result of the cooperation of these complementary shapes, with a supplementary part optionally being fitted. Nevertheless, this second solution requires the coating element to be positioned extremely precisely relative to the base body, so that supplementary movable holding means also have to be used, and makes the base body more complex to produce. Furthermore, this solution cannot be carried out in specific configurations or constructions and can make the structure of the mold considerably more complex.

A third solution includes fitting an adhesive in the region of the interface zone of the base body, so as to retain the edges of the covering element during foaming. This entails additional labor and expense (application of the adhesive) and optimal tightness cannot be guaranteed.

The aim of this invention is, in particular, to overcome the limitations of the above-mentioned solutions.

SUMMARY

Accordingly, the present invention relates to a method for producing a composite part having a first plastics material body forming a core or surface extension substrate including at least one zone or portion forming a depression or basin, set back from the upper or front face of the zone or portion, surrounding said substrate and separated therefrom by a projection forming one or more lateral walls. The depression receives a second body made of foam or a similar cell-like plastics material covered by a skin or a similar covering or finishing element, at least one lateral end portion of which is held between the foam body and a corresponding lateral wall. The method includes fitting into a molding set the first body and an element for covering the depression, with at least one lateral end portion of this element forming an edge extending along a corresponding lateral wall of the relevant projection; in injecting a controlled amount of a foaming material into the space defined in the depression between the first body and the relevant covering element prior to or after closing the mold; and, finally, reopening the mould and withdrawing the composite part after the final formation of the second body or bodies. The construction thus includes a first body with at least one wall portion or a similar protruding structure extending from the base of the depression, along a corresponding lateral wall of the projection of the depression, being at least sufficiently remote from the depression to receive between them a corresponding edge of the covering element and having a height at least slightly smaller than the final thickness of the second foam body. The injected foaming material only enters into contact with the aforementioned edge, during its expansion, once it has circumvented the opposite corresponding wall portion or the like.

The basic idea of the invention is thus to fit an obstalce in the form of a wall portion or the like that diverts the expanding foaming material, so that it cannot come between the rim or rims forming the edge or edges of the covering element and the lateral wall or walls of the projection. The obstacle also advantageously helps to guide and hold in place the or a corresponding edge.

A person skilled in the art will, of course, understand that the provisions of the invention set out above and below may apply to a single depression (and therefore to a single covering element) or to a plurality of depressions (and therefore to a plurality of respective covering elements), as a function of the configuration of the base part or substrate and of the number of local decorative zones provided.

The invention is also described here with reference to an obstacle or obstacles in the form of a circumventing wall portion or portions. Nevertheless, a person skilled in the art will understand that this obstacle(s) may also have other shapes or constrictions, provided that it forms at least one material barrier preventing the expanding foaming mass from developing directly toward the base of the lateral wall (zone of intersection with the base of the relevant depression) and from being introduced between this wall and the adjacent edge of the relevant covering element.

The provision of wall portions or similar structures in the depression allows the aforementioned drawbacks to be overcome, without rendering the production of the first body or base body particularly complex, without complicating the structure of the production mold and without requiring a supplementary device to hold the coating element in place.

For a given depression formed in the base body, the projection between the base of the depression and the surrounding upper or front face of the first body defines at least two opposing, preferably substantially rectilinear and profiled, lateral walls, with each of which a respective circumventing wall portion is associated, the corresponding covering element having two opposing lateral edges that are intended to be accommodated respectively in the gaps in the form of a slot between each (lateral wall/associated wall portion) pair.

In a variant, the projection between the base of the depression and the surrounding upper or front face of the first body defines one or more lateral walls peripherally delimiting the depression and associated with the same number of circumventing wall portions. The corresponding covering element has an edge or edges intended to be accommodated in the gap or gaps in the slot or strip formed between each (lateral wall/associated wall portion) pair.

Although other configurations are possible according to the invention, the lateral wall or walls have advantageously one or more plane faces (face or faces turned toward the depression or basin) and the associated circumventing wall portion or portions have a plane, preferably profiled, structure, the circumventing wall portion or portions extending substantially parallel to it or their associated lateral wall or walls from the base of the relevant depression, or by deviating slightly from this or these lateral wall or walls.

This embodiment facilitates the production of the body, in particular if the body is produced in one piece with the circumventing wall portion by means of injection molding. The projection or projections delimiting the depression can be formed by one or more localized tiered or stepped configurations of the material wall forming, at least locally, the first body in the region of the depression.

The circumventing wall portion may also be attached portions, joined by welding, gluing or the like. They also may optionally have a non-plane structure, allowing improved joining of the foam body.

According to an advantageous variation, the method includes disposing the first body in a first mold portion and at least one appropriate covering element in a second complementary mold portion; drawing together the to mold portions in order to close the mold, prior to or immediately after injecting the foaming material; the guiding edge of the covering element between a respectively corresponding lateral wall and circumventing wall portion, at least during the end phase of the drawing together of the two mold portions; and holding the edge in place between this wall and this wall portion during the consecutive foaming and expansion phase.

Preferably, the first body is disposed in a first upper mold portion and said at least one covering element is disposed in a second lower mold portion.

If the foaming material is injected prior to closure of the mold, the closing process is initiated immediately after the injection, such that the mold is closed well before the expanding foaming material reaches the edges of the space to be occupied by the foam (second foam body) at the end of the expansion and, in particular, the projection zones for localized foaming (projection+wall portion).

According to one characteristic of the invention, there is provided a longitudinal opening, between the free edge of each circumventing wall portion and the covering element that comes to cap it, of sufficient dimensions to allow the passage of a sufficient amount of foaming material to press the relevant edge, disposed between this circumventing wall portion and the associated lateral wall, against the associated lateral wall.

Moreover, for a given depression, at the end of expansion the amount of injected foaming material is sufficient to fill in a homogeneous manner the space delimited by the covering element in cooperation with the base of the depression (in order to produce the final shape of the second foam body) and to force the edges of the covering element against the corresponding lateral wall or walls. The expanding foaming material mass reaches beyond the circumventing wall portions that gradually presses the edges against the lateral wall or walls, starting from the connected longitudinal end up to the free longitudinal end, ending by the ridge of each relevant edge. This ensures close surface contact between each edge and the corresponding lateral wall, even before the expanding foaming material reaches the end or ridge of the edge and prevents any foaming material from escaping between this edge and this wall.

The present invention also relates to a composite part having a base body forming a core or surface extension substrate including at least one zone or portion forming a depression, set back from the upper or front face of the zone or portion, surrounding the substrate and separated therefrom by a projection forming one or more lateral walls, the depression receives a second boy made of foam or a similar cell-like plastics material covered by a skin or a similar covering element. At least one end portion of the covering is held between the foam body and a corresponding lateral wall.

This composite part is characterized in that the first body comprises at least one wall portion or a similar longitudinal protruding structure, attached or formed in one piece, extending from the base of the relevant depression, along a corresponding lateral wall of the corresponding projection. The wall portion is sufficiently remote from this lateral wall to receive between them a corresponding edge of the relevant covering element. The height of the wall portion is slightly smaller than the thickness of the second foam body, which is received in the aforementioned depression. The depression between the first body and the relevant covering element and, on the other hand, the gap between the wall portion and the corresponding edge of the relevant covering element. By pressing the edge against the lateral wall of the relevant projection, the wall portion is embedded in the thickness of the foam body and substantially no foam is present between the edge of the aforementioned relevant covering element and lateral wall.

BRIEF DESCRIPTION OF THE DRAWINGS

A better understanding of the invention will be facilitated by the following description, which relates to a preferred embodiment, given by way of a non-limiting example, and explained with reference to the accompanying schematic drawings, in which.

DETAILED DESCRIPTION

Figure 1A:
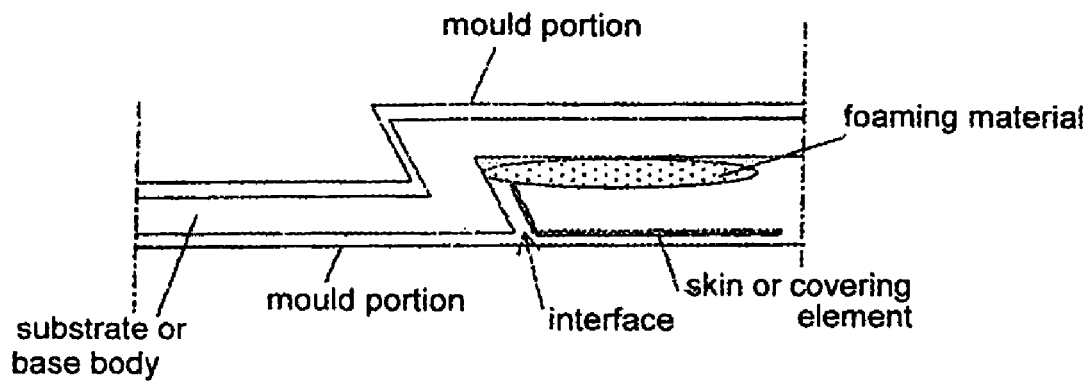
FIGS. 1A and 1B are cross-sectional renderings of the know technology.
Figure 1B:
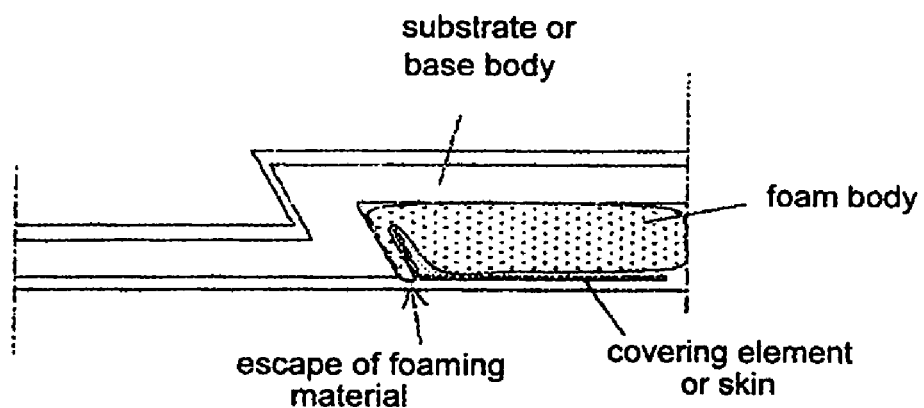
Figure 2:
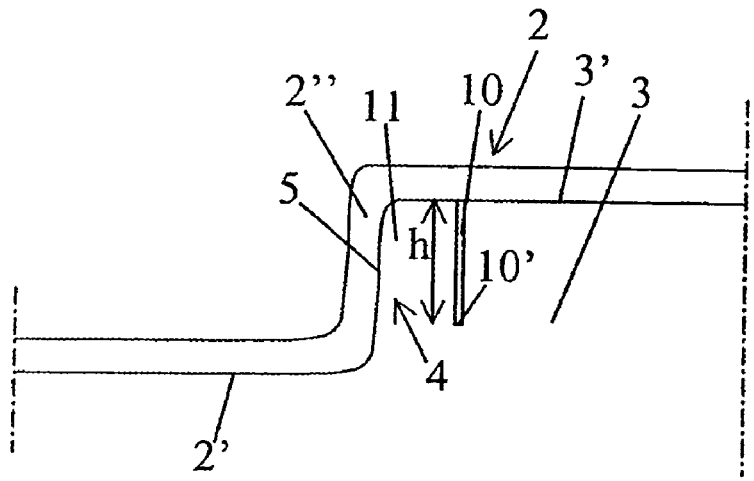
FIG. 2 is a partial cross-section, in the region of the interface zone between a depressed or dished portion and a visible face portion, of a substrate or core forming the base body of a composite part according to the invention.

The invention therefore relates to a composite part and a method for producing composite part 1 having a first plastics material body or base body 2 forming a core or surface extension substrate with at least one zone or portion forming a depression or basin 3, set back from the upper or front face 2' of the zone or portion surrounding the substrate 2 and separated therefrom by a projection 4 forming one or more lateral walls 5. The at least one depression 3 receives a second body

6 made of foam or a similar cell-like plastics material covered by a skin or a similar covering or finishing element 7, at least one lateral end portion 7' of which is held between the foam body 6 and a corresponding lateral wall 5.

This method further includes fitting into a molding set 8, 8' the first body 2 and an element 7 for covering the depression 3. The element 7 includes at least one lateral end portion 7' forming an edge extending along the corresponding lateral wall 5 of the relevant projection 4. A controlled amount of a foaming material 6' is injected into the space 9 defined in the depression 3 between the first body or base body 2 and the relevant covering element 7 prior to or after dosing the mold. Finally, after reopening the mold the composite part 1 is withdrawn after the final formation of the second body or bodies 6.

According to the invention, there is provided a first body 2 with at last one wall portion 10 or similar protruding structure extending from the base 3' of the depression 2, along a corresponding lateral wall 5 of the projection 4 of the depression 3, being at least sufficiently remote from said depression to receive between them the corresponding edge 7' of the covering element 7 and having a height h at least slightly smaller than the final thickness of the second foam body 6. The injected foaming material 6' only enters into contact with the aforementioned edge 7', during its expansion, once it has circumvented the opposite corresponding wall portion 10 or the like.

Figure 3A:
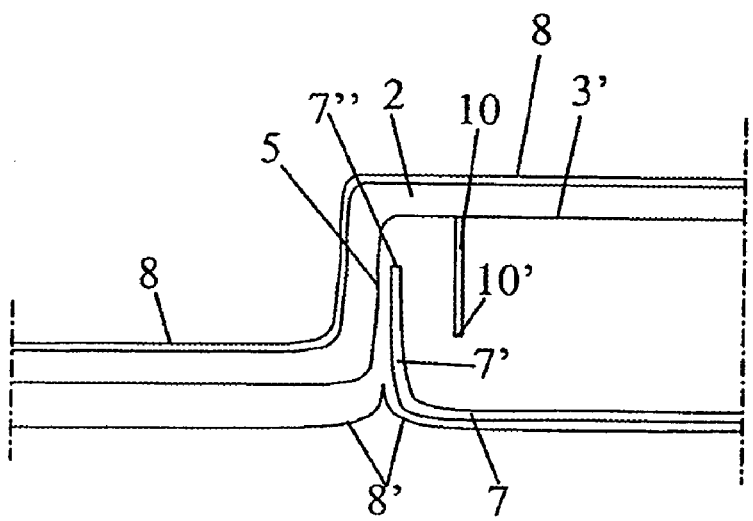
FIG. 3A to 3F are partial cross-sections similar to that of FIG. 2, illustrating the various steps of the method for producing a composite part according to the invention.

The first body or base body 2 is disposed in a first mold portion 8 and the covering element 7 is disposed in a second complementary mold portion 8'. The two mold portions 8 and 8' are drawn together in order to close the mold prior to injection of the foaming material 6'. The edge 7' of the covering element 7 is guided between a respectively corresponding lateral wall 5 and circumventing wall portion 10, at least during the end phase of the drawing together of the two mold portions 8 and 8'. This edge 7' is held in place during the consecutive phase of foaming and expansion between this wall 5 and this portion 10 (FIG. 3a to 3b).

Figure 3B:
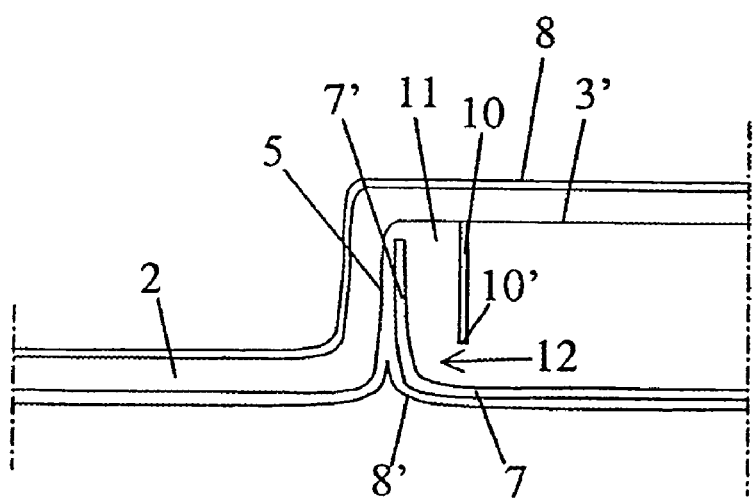
Figure 3C:
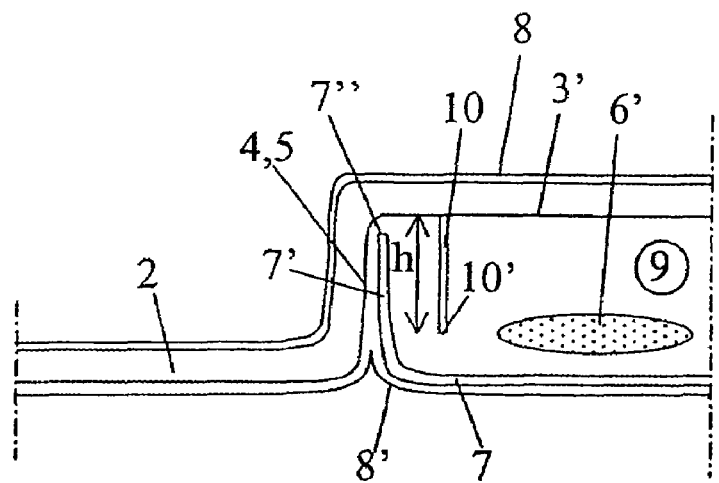

A longitudinal opening 12 is produced between the free edge 10' of each circumventing wall portion 10 and the covering element 7 that comes to cap it, of sufficient dimensions to allow the passage of a sufficient amount of foaming material 6' to press the relevant edge 7', disposed between this circumventing wall portion 10 and the associated lateral wall 5, against said associated lateral wall (FIGS. 1A, 3B and 3C).

Figure 3D:
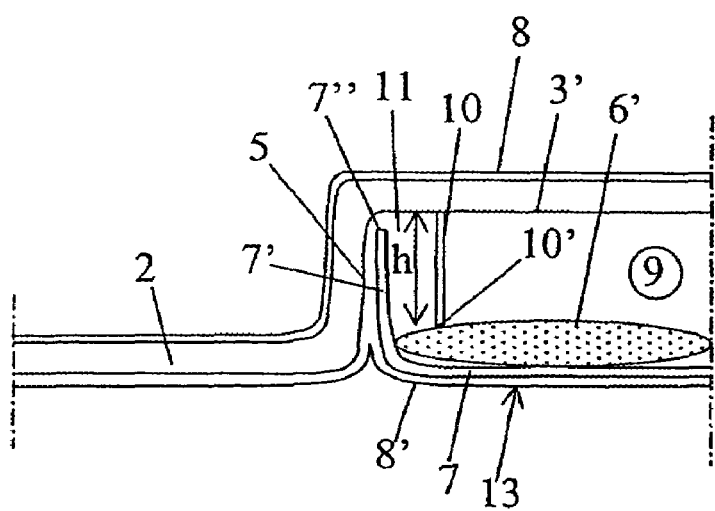
Figure 3E:
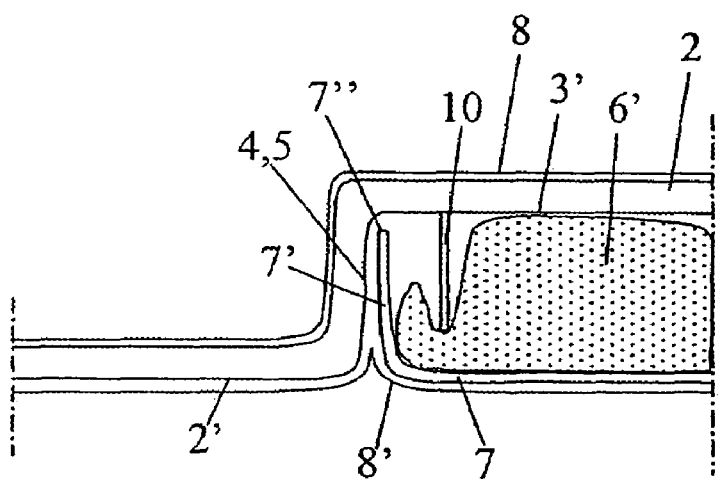
Figure 3F:
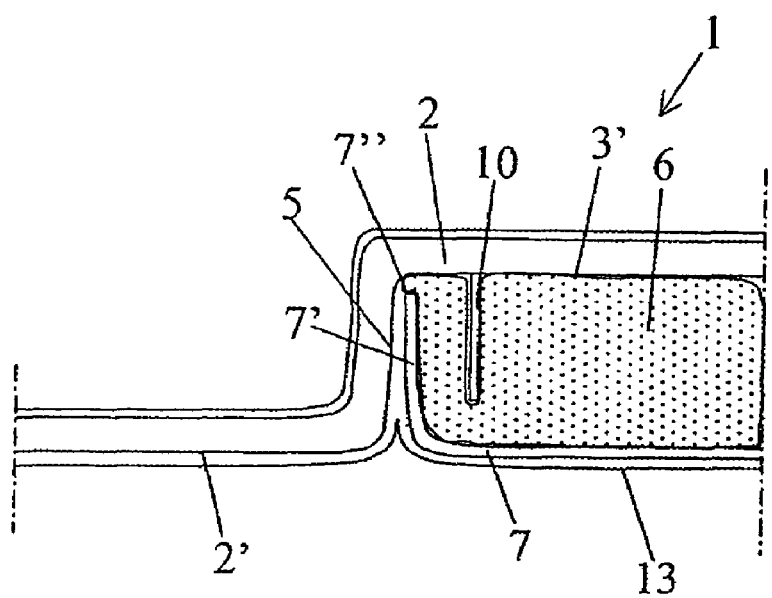

As FIG. 3D to 3F of the accompanying drawings show schematically, the amount of injected foaming material 6' is sufficient to fill in a homogeneous manner, at the end of expansion, the space 9 delimited by the covering element 7 in cooperation with the base 3' of the depression 3 and to force the edge or edges 7' of the covering element 7 against the corresponding lateral wall or walls 5. The expanding foaming material mass 6' reaches beyond the circumventing wall portions or portions 10 and gradually presses the edge or edges 7' against the lateral wall or walls 5, starting from the connected longitudinal end up to the free longitudinal end, ending by the ridge 7" of the or each relevant edge 7'.

By way of example of a practical implementation of the invention, a specific configuration of the method for producing a composite part 1 of the above-mentioned type will be described below with reference to FIGS. 2 to 3A and 3F of the accompanying drawings.

As indicated above, the basic idea of the invention consists in fitting a thin wall portion 10 along the entire length of the lateral wall or each lateral wall 5 of a projection 4 in the region of the interface zone between a depression 3 and the visible face of a base body 2 made of plastics material. The aforementioned interface zone includes a low tier that allows two surfaces located at different levels, i.e., on the one hand, the visible face of the base body made of rigid plastics material and, on the other hand, the set-back face that is intended to be covered and forms the base 3' of the relevant depression 3, to be joined.

The height h of the continuous wall portion 10 is substantially similar to the height of the tier, and this wall portion 10 is disposed parallel to the lateral wall 5 forming the face of said tier, being situated a few millimeters from the face (for a covering element having a thickness of this size).

The wall portion 10 may be produced by injection-molding thermoplastics material at the same time as the base body 2, so as to form a one-piece part from molding. However, this wall portion 10 may also be comprised of an attached element, joined by gluing or another method.

FIG. 3A to 3F illustrate, in the region of an interface zone, the various operational phases of the production method according to the invention.

The covering element 7 is disposed in the lower mold portion 8' and the base body or substrate 2 is fixed in the upper mold portion 8. The mold is then closed by drawing the two portions together. FIG. 3A illustrates the situation during the closure phase and FIG. 3B illustrates the situation after the complete closure of the mold.

It will be noted that the edge 7' is positioned in the region of the interface zone between the lateral wall 5 of the tier of the projection and the parallel wall portion 10. Once the edge 7' penetrates the gap 11 between the wall 5 and the wall portion 10, the edge 7' slides between the two guiding surfaces thus formed, provides good positioning and prevents any movement of the edge 7' other than the vertical downward movement that may occur as a result of its abutment against the base 3' of the depression 3. These provisions prevent any curving or folding of the relevant edge 7' during the closure of the mold, and ensure that the edge 7' is held in place after closure and during foaming.

After closure of the mold, a given amount of foaming material 6' (incorporating a foaming agent" is injected into the space 9, via an injection orifice (not shown) provided for example, in the wall of the base 3' of the depression 3 (FIG. 3C). The injected foaming material 6' then starts its expansion phase and extends, in particular, in the direction of the wall portion 10 and the edge 7' (FIG. 3D).

FIGS. 3D and 3E show the mass of expanding foaming material 6' having to circumvent the wall portion 10 before reaching the edge 7' of the covering element 7.

Once this mass touches this edge 7', it presses it against the lateral wall 5 of the projection 4, ensuring effective tightness. The mass then continues to develop until it reaches the base 3' of the depression 3. This phase is crucial, since the foaming material 6' reaches the free end or ridge 7" of the edge 7' and does not have to continue its development between said edge 7' and the lateral wall 5. Nevertheless, by this stage, said edge 7' is pressed completely against said lateral wall 5 under the pressure of the expanding foam, and there is therefore no free space that would allow the foaming material 6' to come between said edge and said lateral wall (FIG. 3F).

The solution proposed by the invention thus includes controlling the flow of foaming material 6' by forcing the expanding mass to circumvent the wall portion 10 and enter a small zone, the resulting reduction in pressure preventing any foaming material 6' from escaping into the interface zone, while at the same time allowing complete formation of the second foam body 6 and ensuring an optimal finish between the visible face 2' of the first body 2 and the visible face 13 of the covering element 7 (homogeneous and uniform visible sealing groove).

The invention also relates, as FIG. 3F of the accompanying drawings partially shows, to a composite part 1, in particular an internal covering part for a motor vehicle.

This composite part 1 comprises a first plastics material body or base body 2 forming a core or surface extension substrate having at least one zone or portion 3 forming a depression or basin, set back from the upper or front face 2' of the zone or portion surrounding said substrate 2 and separated therefrom by a projection 2 forming one or more lateral walls 5. The depression 3 receives a second body 6 made of foam or a similar cell-like plastics material covered by a skin or a similar covering element 7. At least one lateral end portion 7' of the covering element 7 is held between the foam body 6 and a corresponding lateral wall 5.

This composite part 1 is characterized in that the first body 2 comprises at least one wall portion 10 or a similar longitudinal protruding structure, which is attached or formed in one piece, extending from the base 3' of the relevant depression 3, along at least one corresponding lateral wall 5 of the corresponding projection 4, and which is sufficiently remote from this lateral wall to receive between them the corresponding edge 7' of the covering element 7 and has a height h at least slightly smaller than the thickness of the second foam body 6. The foam body 6 occupies, on the one hand, the space 9 defined in the depression 3 between the first body 2 and the covering element 7 and, on the other hand, the gap 11 between the at least one wall portion 5 and the corresponding edge 7' of the relevant covering element. By pressing the edge 7' against the lateral wall 5 of the relevant projection 4, the wall portion 10 is embedded in the thickness of the foam body 6 and substantially no foam is present between the edge 7' of the aforementioned relevant covering element 7 and the lateral wall 5.

The composite part 1 may include a depression 3 receiving a foam body 6 and a covering element 7, the depression 3 being provided with at least one wall portion 10 forming a gap for receiving an edge 7' of the covering element 7 in cooperation with a lateral wall 5 of the projection 4 delimiting the depression 3.

In a variant form, the composite part 1 may include a plurality of depressions 3, each receiving a foam body 6 and a covering element 7, at least one, and preferably each, depression 3 being provided with at least one wall portion 10 forming a gap for receiving an edge 7' of the covering element 7 in cooperation with a lateral wall 5 of the projection 4 delimiting said depression 3.

Preferably, the aforementioned composite part 1 is obtained using the production method described above.

As FIG. 3F of the accompanying drawings also shows, the surface of the visible face 13 of the covering element 7 is advantageously, from the point of view of appearance, for example, substantially flush with, or protrudes slightly relative to, the surrounding upper or front face 2' of the first body 2. Nevertheless, a greater difference in height between the two visible faces 12 and 13 may also be provided as a function of technical considerations or specific desired visual effects.

The invention is not, of course, limited to the embodiment described and illustrated in the accompanying drawings. Modifications are possible, in particular with regard to the constitution of the various elements or by substitution of technical equivalents, without thereby departing from the scope of protection of the invention.

The invention claimed is:

1. A composite part comprising:
    a first body having a portion defining a depression with a base wall set back from a front face and separated therefrom by a lateral wall, the first body further including a protruding structure extending from the base wall adjacent a periphery of the base wall and defining a wall portion corresponding along at least a part of the lateral wall, the lateral wall and the wall portion being spaced apart and generally defining a slot therebetween along the periphery of the base wall;
    a covering material having a lateral end portion defining an edge, the covering material being located over the depression and at least a portion of the edge and the lateral end being located within the slot;
    a second body located within the depression, the second body having a first part located between the base wall of the depression and the covering material and a second part located in the slot between the wall portion and the lateral end of the covering material, wherein the second part substantially fills the space between the lateral wall and the lateral end of the covering material such that the lateral end is pressed and retained against the lateral wall.

2. The composite part of claim 1 wherein the edge of the covering material is located within a free space in the slot where the second body is absent.

3. The composite part of claim 2 wherein the lateral wall has a first height and the protruding structure has a second height that is less than the first height.

4. The composite part of claim 2 wherein a gap is defined between an end of the protruding structure and the covering material.

5. The composite part of claim 4 wherein a portion of the second body is located within the gap.

6. The composite part of claim 1 wherein the lateral wall and the wall portion have a common profile.

7. The composite part of claim 1 wherein the wall portion extends along the entire length of the lateral wall.

8. The composite part of claim 7 wherein the wall portion is continuous.

9. The composite part of claim 1 wherein the wall portion circumvents the periphery of the base wall.

* * * * *